Patented Dec. 23, 1947

2,433,232

UNITED STATES PATENT OFFICE 2,433,232

METHOD OF PREPARING RIBOFLAVIN FROM LACTEAL MATERIAL

Reginald E. Meade, Nelson E. Rodgers, and Henry L. Pollard, Appleton, Wis., assignors to Western Condensing Company, San Francisco, Calif., a corporation of California No Drawing. Application November 11, 1944, Serial No. 563,080

6 Claims. (Cl. 195—42)

This invention relates to processes for the manufacture of biologically active materials such as vitamins by fermentation processes. More particularly, the invention pertains to the synthesis, from lactose-containing products (in particular, lacteal material), of riboflavin and other vitamins by the action of bacteria, and, more specifically, by the action of the bacterium *Clostridium acetobutylicum*.

The present application is a continuation-in-part of the application of Henry L. Pollard, Nelson E. Rodgers and Reginald E. Meade, Serial No. 439,310, filed April 17, 1942, and entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk under controlled conditions to the fermenting action of *Clostridium acetobutylicum*. Such a fermentation synthesis of riboflavin is accompanied by the formation of neutral solvents such as ethanol, acetone and butanol, and gases such as hydrogen and carbon dioxide, which can be recovered as valuable by-products.

To prepare a lactose-containing lacteal medium such as whey or skim milk for fermentation to increase its riboflavin content, it is sterilized completely or substantially completely as by heat treatment at about 250° F. for about ten to twenty minutes. In addition, the acidity of the lacteal medium is neutralized preferably to a pH of 6 or 7 by adding an alkaline reagent such as sodium, potassium or calcium hydroxide. Calcium carbonate may be added to enhance riboflavin production. The iron content of the lacteal medium is adjusted to within a range of 0.5 to less than 4.5 parts per million. Whey uncontaminated with iron, as by corrosive contact with the walls of an iron container, normally contains from 0.10 to 0.21 part per million of whey. The iron content of such whey can be adjusted to the indicated content of from 0.5 to less than 4.5 parts per million by addition of soluble ferrous salts. If the whey is contaminated with iron compounds to an extent raising its iron content to 4.5 parts per million or higher, such whey can be diluted with uncontaminated whey.

The thus prepared material cooled to a temperature of about 100° F. is placed in a fermenting container and inoculated with *Clostridium acetobutylicum* (such as described by McCoy, Peterson and Hastings in "Journal of Infectious Diseases," volume 39, page 457), preferably at a temperature of about 100° F. under conditions such as will prevent the introduction of iron and contaminating organisms. A starter having a suitable volume for the batch to be fermented can be prepared from an original small culture by a series of transfers of said culture to nutrient medium such as whey.

In general, fermentation of a batch of whey can continue for from twelve to forty-eight hours, or until there is no noticeable further increase in the riboflavin content.

The gases formed during fermentation can be vented from the fermenting tank as formed. The solvents formed during fermentation can be removed by fractional distillation, and after removing volatile products the fermented material can be concentrated by evaporation to produce a concentrated liquor. This liquor can be further subjected to drying to produce a powdered product.

If desired, instead of separately fractionating the solvents, they can be condensed from the vapors evolved during concentration of the fermented material by evaporation, to form a water-solvent mixture from which the solvents can be removed by fractional distillation.

At some point after fermentation it is desirable to inhibit further bacterial action, as for example by heat sterilization applied as a separate step or in conjunction with concentration by evaporation.

The product obtained by the above procedure is a concentrate which can be further refined or blended with various food material for human or animal consumption. By use of the process described hereinabove, the riboflavin content of whey has been increased from about 1.4 to from 6 to 70 micrograms per milliliter (before concentration by evaporation), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are the remaining solids of the whey or skim milk employed and therefore are available as food ingredients which are used to advantage when the product is blended with other material such as various milk products, bread and bakery products, poultry and animal feeds, and the like.

We have now found that the yield of riboflavin in the fermentation process described hereinabove can be greatly improved by incorporating xylose or xylose-containing material with the whey or other lactose-containing material to be fermented.

It is therefore an important object of the present invention to provide improved methods of synthesizing biologically active material, such as riboflavin, from lacteal or lactose-containing liquids by fermentation methods including the step of incorporating xylose or xylose-containing material with said liquids.

Another object is to increase the yields of riboflavin obtained from whey by fermenting the whey with *Clostridium acetobutylicum* in the presence of xylose or xylose-containing material.

Other and further features and objects of the present invention will become apparent from the following description and appended claims.

In proceeding according to the present invention the directions given hereinabove as applied to the methods of the copending application are followed except for the variations disclosed hereinbelow.

The xylose or xylose-containing material may be added to the whey to be fermented before the latter is sterilized. As much as 2% by weight of xylose may be added, although additions of from 0.5 to 1% are ordinarily just as effective in raising the riboflavin yield. Additions of xylose as small as 0.1% effect a distinct improvement in riboflavin yields.

The type of results obtained when proceeding according to the present invention are illustrated by experiments described hereinbelow. The basal medium used for the experiments was rennet whey, supplemented with ferrous sulfate in amounts effecting concentrations of added iron as tabulated in the following table. Duplicate samples having identical iron content were prepared. Xylose was added in the tabulated amounts expressed in per cent by weight of the nutrient medium (whey). The samples were further supplemented with 0.15% by weight calcium carbonate, 0.15% by weight tricalcium phosphate, 4.8 parts per million of zinc sulfate heptahydrate, 4.2 parts per million manganous sulfate monohydrate, and 10 parts per billion of para-amino benzoic acid. The various media were autoclaved in 100 milliliter volumes, inoculated with 4% of a suitable *Clostridium acetobutylicum* starter and inoculated at 100° F. for 48 hours. The riboflavin yields in duplicate cultures are shown in the following table:

| Xylose (per cent by wt. of whey) | Flavin μg/ml, Added Iron in Parts Per Million | | | | |
|---|---|---|---|---|---|
| | 0.84 | 1.12 | 1.40 | 1.68 | 2.24 |
| 0 | 64 / 54 | 60 / 64 | 59 / 58 | 60 / 60 | 39 / 44 |
| 0.10 | 66 / 71 | 75 / 72 | 68 / 67 | 66 / 55 | 51 / 48 |
| 0.25 | 65 / 69 | 78 / 66 | 77 / 77 | 74 / 75 | 50 / 59 |
| 0.50 | 65 / 78 | 72 / 92 | 83 / 86 | 80 / 82 | 59 / 61 |
| 0.75 | 54 / 88 | 93 / 81 | 68 / 86 | 74 / 86 | 61 / 63 |
| 1.00 | 74 / 67 | 82 / 73 | 94 / 97 | 64 / 84 | 63 / 68 |
| 1.50 | 66 / 84 | 81 / 71 | 76 / 54 | 55 / 52 | 50 / 48 |
| 2.00 | 80 / 75 | 76 / 60 | 57 / 62 | 52 / 45 | 42 / 40 |

It appears from the tabulated data that the effectiveness of the xylose supplement probably is not due primarily to the utilization of the xylose as an additional source of energy. In the control, the average maximum synthesis of 62 micrograms per milliliter represents a yield of about 1380 micrograms per gram of available lactose. Addition of 0.1% xylose causes a 12 micrograms per gram increase in the average maximum, or 12,000 micrograms per gram of xylose, which is about 8.7 times the yield from lactose.

Xylose is preferably but not necessarily added before the whey or other lactose-containing material is sterilized. A distinct improvement in riboflavin yield is effected by the addition of xylose to the whey as late as fifteen hours after initiation of fermentation (about the time of initiation of riboflavin synthesis in the whey). This is illustrated by the following experiment in which riboflavin synthesis was compared in whey to which xylose was added before sterilization and in whey to which xylose was added asceptically to a fifteen hour-old culture:

| Treatment | Flavin μg/ml, Added Iron in Parts Per Million | | | |
|---|---|---|---|---|
| | 0.84 | 1.12 | 1.40 | 1.68 |
| Control | 54 / 53 | 52 / 54 | 50 / 57 | 47 / 44 |
| 0.1% l-xylose added before sterilization | 51 / 59 | 64 / 67 | 62 / 62 | 58 / 54 |
| 0.1% l-xylose added asceptically at 15 hour culture age | 56 / 42 | 72 / 62 | 60 / 61 | 60 / 63 |

Sulfite liquor may be used as a supplement since it contains xylose as a component of the pentose fraction of wood sugar present in sulfite liquor. Depending upon the wood used, sulfite liquor contains from about 1.0 to 3.0 grams of xylose per liter.

Wood hydrolysates and by-products of pulp wood digestion can be used as a source of xylose provided that iron and other toxic materials are removed.

In the foregoing, particular reference has been made to synthesis of riboflavin. It is to be understood, however, that other nutritive or vitamin factors, or factors of vitamin B complex may be synthesized in addition to riboflavin.

Many details of composition and procedure may be varied within a wide range without departing from the principles of this invention and it is therefore not our purpose to limit the scope of the patent granted on this invention otherwise than necessitated by the scope of the appended claims.

We claim as our invention:

1. In a process for manufacturing a vitamin concentrate including riboflavin by fermenting a lacteal lactose-containing material with *Clostridium acetobutylicum*, the improvement comprising incorporating xylose with said material.

2. In a process for manufacturing riboflavin by fermenting whey with *Clostridium acetobutylicum* in the presence of a salt of iron, the improvement comprising incorporating xylose with said material.

3. In a process for manufacturing riboflavin by fermenting whey with *Clostridium acetobutylicum* in the presence of a salt of iron, the improvement comprising incorporating with said material from 0.1 to 2.0% of xylose before said fermentation has proceeded for fifteen hours.

4. In a process for manufacturing riboflavin by fermenting whey with *Clostridium acetobutylicum* in the presence of a salt of iron, the improvement comprising incorporating with said material from 0.1 to 2.0% of xylose.

5. In a process for manufacturing riboflavin by fermenting a lacteal lactose-containing material with *Clostridium acetobutylicum*, the improvement comprising providing a lacteal material containing from 0.5 to less than 4.5 parts per million of iron in excess of the normal iron content of said material and incorporating with the material so provided from 0.1 to less than 1.5% of xylose.

6. In a process for manufacturing riboflavin by fermenting whey with *Clostridium acetobutylicum*, the improvement comprising providing whey containing from 0.5 to less than 4.5 parts per million of iron in excess of the normal iron content of said whey and incorporating with the whey from 0.1 to less than 1.5% of xylose, the excess iron content in said whey being in excess of 0.84 part per million whenever said xylose is incorporated with said whey subsequently to the initiation of said fermentation.

REGINALD E. MEADE.
NELSON E. RODGERS.
HENRY L. POLLARD.

REFERENCES CITED

The following references are of record in the file of this patent:

UNITED STATES PATENTS

| Number | Name | Date |
|---|---|---|
| 2,297,671 | Yamasaki | Sept. 29, 1942 |
| 2,128,845 | Myers | Aug. 30, 1938 |
| 1,913,164 | Legg | June 6, 1933 |
| 2,369,680 | Meade et al. | Feb. 20, 1945 |
| 1,911,411 | Viljoen | May 30, 1933 |